(12) United States Patent
Radulescu

(10) Patent No.: US 7,350,552 B2
(45) Date of Patent: Apr. 1, 2008

(54) DIRECTIONAL TREAD HAVING INCISIONS OF VARYING INCLINATION

(75) Inventor: Robert Radulescu, Perignat-les-Sarlieve (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 25 days.

(21) Appl. No.: 10/614,924

(22) Filed: Jul. 8, 2003

(65) Prior Publication Data
US 2004/0003879 A1    Jan. 8, 2004

Related U.S. Application Data

(63) Continuation of application No. PCT/EP01/14693, filed on Dec. 13, 2001.

(30) Foreign Application Priority Data
Jan. 10, 2001    (FR) .................................. 01 00352

(51) Int. Cl.
*B60C 11/04*    (2006.01)
*B60C 11/12*    (2006.01)
(52) U.S. Cl. ........................... 152/209.18; 152/209.23; 152/901; 152/DIG. 3
(58) Field of Classification Search ........... 152/209.18, 152/209.23, 901, DIG. 3
See application file for complete search history.

(56) References Cited

U.S. PATENT DOCUMENTS 2,186,180 A * 1/1940 Sloman et al. ......... 152/DIG. 3
2,246,479 A     6/1941 Schrank
2,261,025 A * 10/1941 Havens .................. 152/DIG. 3
3,909,906 A * 10/1975 MacMillan ................. 152/523

(Continued)

FOREIGN PATENT DOCUMENTS

DE        41 07 547 C2     9/1991

(Continued)

OTHER PUBLICATIONS machine translation for German 19506697, Nov. 20, 2005.*

(Continued)

*Primary Examiner*—Steven D. Maki
(74) *Attorney, Agent, or Firm*—Buchanan Ingersoll & Rooney PC

(57) ABSTRACT

A tread (1) for steer axle tires for a heavy vehicle, the tire having a preferred direction of travel, the tread comprising grooves (2) of generally circumferential orientation defining at least three ribs (30, 31, 32, 33, 34), two of the ribs forming the edges (30, 34) of the tread, some of the intermediate ribs (31, 32, 33) being provided with a plurality of incisions (41, 42, 43), of general transverse orientation and substantially parallel to each other, the incisions having an average inclination other than zero relative to the direction perpendicular to the running surface of a new tread, this tread being characterised in that, when viewed in a section plane perpendicular to the axis of rotation of the tyre, the incisions in the intermediate ribs form, on and in the vicinity of the running surface when new of the tread, an angle close to or equal to 0° with a line perpendicular to said surface at the point of intersection, whereas the angle of each of these incisions increases in the depth of the tread.

11 Claims, 1 Drawing Sheet

U.S. PATENT DOCUMENTS

| | | | | |
|---|---|---|---|---|
| 5,795,415 A | * | 8/1998 | Campana et al. | ...... 152/DIG. 3 |
| 5,896,905 A | | 4/1999 | Lurois | |
| 6,202,725 B1 | * | 3/2001 | Moriya | ................. 152/DIG. 3 |
| 6,868,879 B2 | * | 3/2005 | Radulescu | ............. 152/DIG. 3 |

FOREIGN PATENT DOCUMENTS

| | | | |
|---|---|---|---|
| DE | 19506697 | * | 8/1996 |
| EP | 0 384 182 B1 | | 8/1990 |
| EP | 0 810 104 A1 | | 12/1990 |
| EP | 0 861 741 A2 | | 9/1998 |
| JP | 8-66923 | * | 3/1996 |
| WO | WO 96/01190 | * | 1/1996 |

OTHER PUBLICATIONS

Patent Abstracts of Japan, JP 07001918, published Jan. 6, 1995.

* cited by examiner

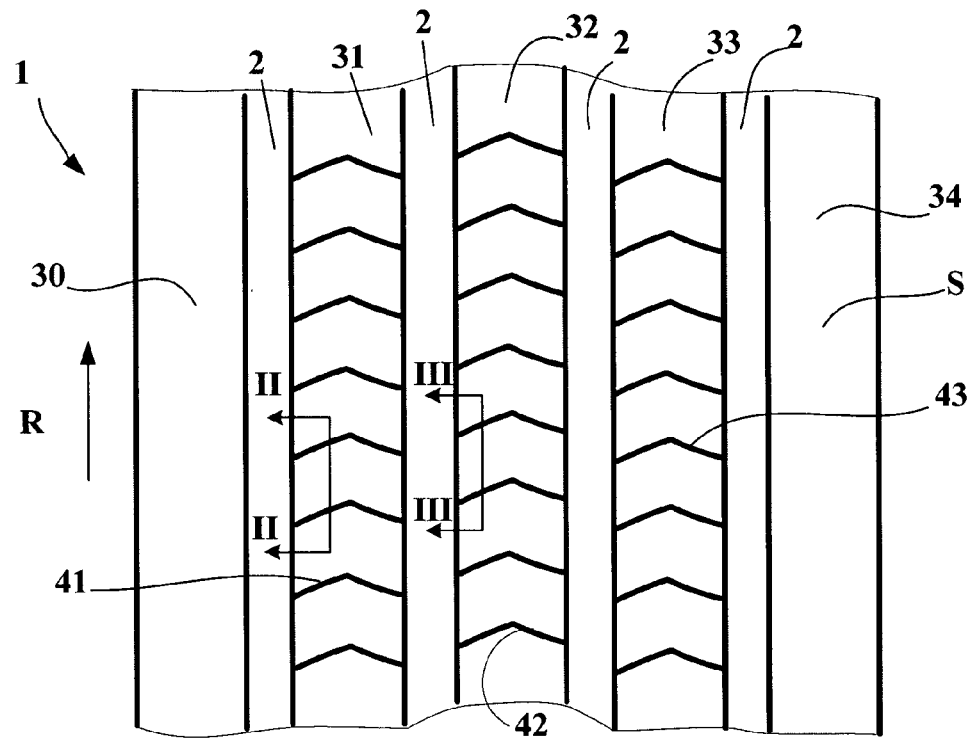
FIG. 1
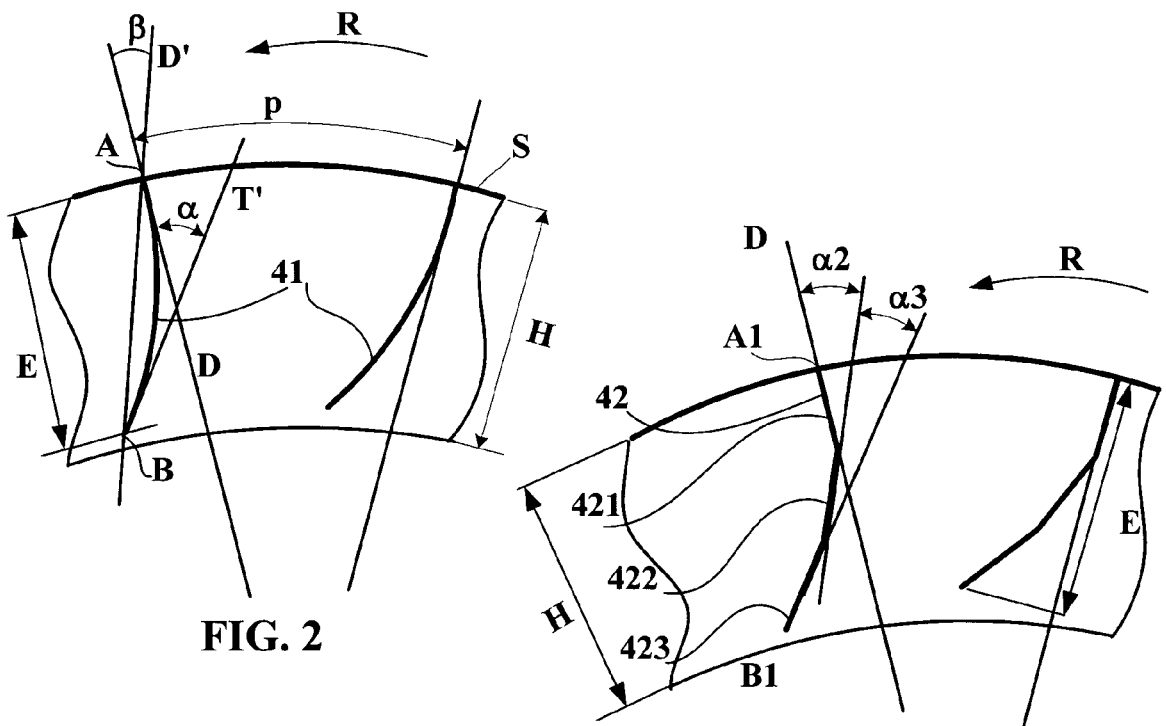
FIG. 2
FIG. 3

DIRECTIONAL TREAD HAVING INCISIONS OF VARYING INCLINATION

This application is a continuation of PCT/EP01/14693 filed Dec. 13, 2001, designating the United States.

BACKGROUND OF THE INVENTION

The present invention relates to treads for tires intended to be fitted on the front axle of transport vehicles and more particularly heavy vehicles, for example, long haul trucks for highway use.

Tires for heavy vehicles typically comprise a carcass reinforcement comprising a plurality of reinforcements arranged radially, the carcass reinforcement itself being surmounted by a crown reinforcement extending in the circumferential direction. This crown reinforcement is composed of at least two plies superposed on one another, each ply being formed of a rubber mix reinforced by a plurality of cables or cords of low extensibility, preferably made of steel, arranged parallel to each other in one and the same ply and in a direction forming an angle with the tire circumferential direction at most equal to 40°, the cables from one ply to the other being crossed between each other. This crown reinforcement may further include, on one hand, two half-plies formed of cables of low extensibility forming with the circumferential direction an angle of between 45° and 80°, and on the other hand, at least one ply formed of so-called "elastic" cables placed radially to the outside of the crown plies, the reinforcement cables of which form an angle of less than 40°.

The crown reinforcement is furthermore surmounted on its radially outer surface by a tread formed with at least one rubber mix, the radially outer surface of which forms the running surface intended to come into contact with the roadway during travel of said tire.

In order to obtain satisfactory grip performance during travel on a roadway covered with water, the tread is provided on its outer surface, in the case of tires intended for fitting on the front steering axle of heavy vehicles, with a plurality of grooves of generally circumferential orientation. These grooves form a tread pattern comprising a plurality of ribs, each rib having a contact face radially to the outside and lateral walls which may be substantially perpendicular to the contact face of the rib or alternatively which may form a taper angle other than zero with this face. To improve the grip still further, it is known to provide some of the ribs with a plurality of grooves and/or incisions of transverse orientation. These transverse cutouts and the longitudinal grooves define a plurality of rubber pattern elements having during travel a leading edge or ridge, that is to say an edge which comes into contact with the roadway before the rest of the contact surface of said element, and a trailing edge. The appearance of what is called "irregular" wear, as it develops on the contact surface of these elements in the vicinity of the trailing edge during travel of the tire provided with this tread was noted.

In order to improve the resistance to this irregular wear of this tread by reducing the tendency to irregular wear on the surfaces located close to the trailing edges, the Applicant proposed a new tread pattern described in European Patent EP 0384182 (U.S. Pat. No. 5,896,905).

According to this document, there is proposed a tread pattern comprising circumferential grooves so as to provide the tread with at least five ribs, in which at least the ribs defined by two circumferential grooves being provided with incisions of a width of less than 3 mm, which are transverse and substantially parallel to each other, these incisions being inclined by an angle of between 5° and 25° relative to a direction perpendicular to the running surface of the tread such that the resulting force exerted, during travel in the zone of contact with the ground, by the ground on the tread tends to straighten the incisions towards a zero inclination relative to said perpendicular direction.

Although this arrangement makes it possible effectively to combat this type of irregular wear, it will be noted that the overall average wear of the edge ribs is substantially increased relative to the average overall wear of the intermediate ribs. This difference in wear is, after a certain mileage traveled, the cause of the appearance of what is called "rail" irregular wear on the longitudinal edges of the edge ribs; this wear is linked to the development of braking stresses exerted by the roadway on these edge ribs resulting from the differences in lengths traveled by the edge ribs and the intermediate ribs.

Simplified, the wear becomes more regular but the wear life of the tread is reduced compared with that of a tire having a tread which is not provided with inclined incisions. "Wear life" is understood to mean the possible period of use before complete wear of a tread of a tire during travel, resulting either in the changing of the tire or in the renewal of the tread by recapping.

There is therefore a need for a tread pattern for tires which are intended to be fitted on the front axle of heavy vehicles which has no (or only little) irregular wear and substantially the same rate of wear for all the ribs, while maintaining a low average rate of overall wear, these performances imparting to the tire an improved life compared with the tire of the European application previously mentioned.

SUMMARY OF THE INVENTION

According to the invention, a tire tread intended to be fitted on the front axle of a heavy vehicle comprises a radial carcass reinforcement surmounted by a crown reinforcement, the tread having grooves of generally circumferential orientation defining at least three ribs, two of said ribs forming the edges of the tread, some of the intermediate ribs (that is to say, those located between the edge ribs) being provided with a plurality of incisions of a width less than 3 mm, of depth E and of generally transverse orientation and substantially parallel to each other, these incisions having an average inclination other than zero relative to the direction perpendicular to the running surface of the tread when new such that the resultant force exerted during travel in the zone of contact with the roadway by said roadway on the tread tends to straighten the incisions towards a zero average inclination relative to this perpendicular line, this tread being characterized in that, viewed in a section plane perpendicular to the axis of rotation of the tire:

each incision formed on the intermediate ribs forms, on the running surface of the tread when new and at most to one-third of the incision depth E, an angle equal to not more than 5° with a line perpendicular to said surface at the point of intersection, each of these incisions forming with the same perpendicular line an angle which increases with the depth of the tread, the points of said incision which are farthest to the inside in the tread being located, relative to said perpendicular line, in front of the points of the incision located on the running surface of the tread when new.

A point of an incision located to the inside of the tread is said to be in front of the point of the incision on the running surface when new when a radial plane (plane containing the axis of rotation of the tire) passing through the point of the incision on the running surface when new is rotated in the direction of travel to bring it to the point of the incision within the tread.

"Angle close to or equal to 0° with a perpendicular line" is to be understood to mean an angle equal to at most 5° (this angle may equally well be positive or negative).

The average inclination of an incision is given by the angle formed by the direction connecting a point of the incision on the running surface of the tread and the point farthest to the inside of the tread taken in the same section plane perpendicular to the axis of rotation.

The tires according to the invention are intended to be mounted on the front or steer axle of a heavy vehicle, the average inclination of the incisions of the ribs being selected such that the resulting average forces exerted by the ground on each of said ribs act in a direction tending to straighten said incisions and hence the rubber elements defined by these incisions. In order to permit easy installation of tires according to the invention on a heavy vehicle, provision may be made for each tire to comprise a visible means indicating the preferred direction of travel.

By varying the inclination of the incisions between the running surface when new and after different levels of wear of the tread (i.e., different depths of the tread), it is possible to adjust the distribution of the resulting average forces on the different ribs throughout the use of the tire fitted with a tread according to the invention. In particular, the greater inclination of the incisions after partial wear of the tread results in maintaining the differential of resulting average forces between the intermediate ribs provided with inclined incisions and the edge ribs without incision, which is particularly favorable after partial wear of the tread to avoid excessively wearing down the edge ribs.

In order to obtain a satisfactory effect on the wear of the edge ribs, it is preferable for the incisions of varying inclination in the depth to be arranged on at least one of the intermediate ribs and at an average pitch p such that the ratio k, $$k = \frac{Sne}{Se} \cdot \frac{p}{H}$$

satisfies the following relationship:

$0.5 \leq k \leq 4$ where Sne is the total of the surface areas of the ribs not provided with incisions of varying inclination within the thickness according to the invention (edge ribs and possibly other intermediate ribs), Se is the total of the surface areas of the ribs provided with incisions of varying inclination within the thickness according to the invention, and H is the average depth of the longitudinal grooves.

When the value of k is less than 0.5, the variation in rigidity of the ribs provided with incisions of varying inclination within the thickness relative to the rigidity of the edge ribs is too pronounced and the desired effect is not obtained. Likewise, when the value of k is greater than 4, the modification of the rigidity of the ribs which are provided with incisions of varying inclination within the thickness is not sufficient to adjust the problem of irregular wear on the edge ribs.

Preferably, the incisions have depths E close to the depths H of the longitudinal grooves so as to protect the entire height of the edge ribs.

Preferably, the incisions of varying inclination satisfy the following values:

Average inclination between 5° and 15°;
Inclination at the inner end: 5° to 25°.

The incisions of varying inclination may have a regular, gradual variation of inclination or alternatively a variation of any other form (for example linear in pieces).

BRIEF DESCRIPTION OF THE DRAWINGS

Other characteristics and advantages of the invention will become apparent from the description given hereafter with reference to the appended figures, which show, by way of non-limitative examples, forms of embodiment of the subject of the invention.

FIG. 1 shows a plan view of part of a tread for a heavy vehicle according to the invention;

FIG. 2 shows a sectional view along the line II-II through the tread shown in FIG. 1;

FIG. 3 shows a sectional view along the line III-III of the tread shown in FIG. 1.

DETAILED DESCRIPTION

In FIG. 1, there is shown part of the running surface S of a tread 1 of a tire according to the invention intended for the front axle of a heavy vehicle. This tread 1 comprises three main grooves 2 oriented circumferentially, these three grooves having a depth H of 18 mm. These grooves 2 define three intermediate ribs 31, 32, 33 and two edge ribs 30, 34, each edge rib axially limiting the contact zone of the tread with the roadway during travel of the tire. The intermediate ribs positioned between the edge ribs are provided with a plurality of incisions 41, 42, 43 of varying inclination in the direction of the thickness or depth of the tread and passing through each of said intermediate ribs on either side. These incisions have, on the running surface S, a V-shaped trace the toe or apex of which is directed in the preferred direction of rotation (marked by the arrow R) of the tire provided with this tread.

In order to obtain a satisfactory effect on the wear of the edge ribs, it is preferable for the incisions of varying inclination to be arranged on at least one of the intermediate ribs and at an average pitch p such that the ratio k, $$k = \frac{Sne}{Se} \cdot \frac{p}{H}$$

satisfies the following relationship:

$0.5 \leq k \leq 4$ where Sne is the total of the surface areas of the ribs not provided with incisions of varying inclination according to the invention (edge ribs and possibly other intermediate ribs), Se is the total of the surface areas of the ribs provided with incisions of varying inclination according to the invention, and H is the average depth of the longitudinal grooves.

The average pitch p between the incisions of varying inclination is, in the case in question, constant for each rib, but it could be different, depending on the rib in question. This average pitch p here is equal to 38 mm. The ratio $$k = \frac{Sne}{Se} \cdot \frac{p}{H}$$

in the exemplary embodiment is equal to 1.7; the non-incised surface Sne being proportional to the total of the widths of the edge ribs 30, 34, each equal to 45 mm, and the incised surface Se being proportional to the total of the widths of the intermediate ribs 31, 32, 33, each equal to 35 mm.

FIG. 2 shows a section through the intermediate rib 31 located adjacent to the edge rib 30, this section belong taken along the line II-II of FIG. 1 in a plane perpendicular to the axis of rotation of the tire. In this section, there can be seen incisions 41 of total depth E slightly less than the depth H of the grooves of varying inclination and having a curved or arcuate shape, the average inclination of which is equal to 7° (the average inclination of the incision being equal to the angle β defined as the angle between a line D perpendicular to the running surface at the point A of intersection of the incision with the running surface and a straight line D' located in the section plane and passing through the point A of intersection of this incision with the running surface and the point B farthest to the inside of the same incision).

The angle α, defined, in the plane of FIG. 2, between a the tangent T to the trace of the incision at the point A on the running surface when new and the line D perpendicular to the running surface at the same point A; is zero in the example described and shown, the tangent T at point A coinciding with the line D; this angle of increase gradually and regularly with the depth to reach 10° for the tangent T' at the point B farthest to the inside of the tread (this point B being located at a distance E from the running surface when new).

FIG. 3 shows a section along the line III-III through the central rib 32 of the tread 1 shown in FIG. 1. This central rib comprises a plurality of incisions 42 distributed regularly in the circumferential direction with a pitch of 38 mm, each of said incisions having, viewed in section, a succession of three rectilinear traces, the total depth E of these incisions being slightly less than the depth H of each groove 2 (the latter depth H being equal to the height of the rib 32). The first trace 421 is perpendicular to the running surface at the point A1 of intersection of the incision with the running surface and extends over a depth substantially equal to one-third of the height H of the central rib 32. The second rectilinear trace 422 forms an angle α2 equal to 5° with the first trace 421 and extends it over approximately one-third of the height of the rib. The final rectilinear trace 423 forms an angle α3 equal to 5° with the second trace 422 and extends it over approximately one-third of the height of the rib as far as the point B1 of the end of the incision.

Each incision 41, from its point A to its point B, has a concave side and a convex side, the concave side facing in the rolling direction R (i.e., facing to the left in FIG. 2). In FIG. 3 the incisions 421 have generally concave and convex sides, and the generally concave side faces in the rolling direction R.

The invention is not limited to the examples described and shown, and various modifications can be made thereto without departing from the scope thereof.

In particular, the intermediate ribs located directly in the vicinity of the edge ribs may furthermore comprise a plurality of incisions which open only on to their edge located on the side of said edge ribs; these incisions having, as is known, the function of protecting the intermediate ribs from irregular wear adversely affecting the longitudinal edges of said ribs. These latter incisions may follow the same profile as the incisions of varying inclination and also be of varying inclination.

Furthermore, and over all the ribs, including those of the edge, incisions of low depth compared with the depth of the grooves can be produced: these incisions, of a depth of between several tenths of millimeters and two millimeters, only play a part when the tread is new, before disappearing after wear in the very first kilometers of travel, and in no way modify the rigidities of the pattern of the tread.

What is claimed is:

1. A steer axle tire for a heavy vehicle, the tire designed for a single rolling direction and comprising a radial carcass reinforcement surmounted by a crown reinforcement and a tread, the tire including a visual indicator indicating the single rolling direction, the tread comprising ribs separated by grooves of generally circumferential orientation, two of said ribs forming the edges of the tread, and at least two of said ribs being intermediate such two edge ribs, the intermediate ribs having a plurality of incisions, all incisions being V-shaped and oriented in the same direction, each incision being of a width of less than 3 mm, a depth E when the tread is new and substantially parallel to each other, wherein each incision has an angular relationship with a line extending perpendicular to the point where the incision intersects the tread's outer surface, the angular relationship varying along the incision wherein the angular relationship in an outer tread region extending from the outer surface to a depth of one-third E is zero degrees, and the angular relationship in an inner tread region at a depth greater than one-third E being greater than the angular relationship in the outer tread region, wherein a radially innermost first point of each incision is located, relative to the indicated rolling direction of the tire, in front of a second point of the incision located on the running surface of the tread when new, wherein each incision, from its second point to its first point, has a generally concave side and a generally convex side, the generally concave side facing in the rolling direction and further wherein the two edge ribs are free of incisions having varying inclination.

2. The tire according to claim 1, wherein an average inclination of the incisions is between 5° and 15°.

3. The tire according to Claim 2, wherein the inclination of a portion of the incision at a depth greater than one-third E is between 5° and 25°.

4. The tire according to Claim 2, wherein the incisions are spaced in the circumferential direction with a pitch p which satisfies the following relationship:

$$0.5 \leq \frac{Sne}{Se} \cdot \frac{p}{H} \leq 4$$

wherein, Sne is the total outer surface area of the edge ribs not provided with incisions of varying inclination, Se is the total of the outer surface area of the intermediate ribs provided with incisions of varying inclination, and H is the average depth of the grooves of generally circumferential direction.

5. The tire according to Claim 1, wherein the inclination of a portion of the incision at a depth greater than one-third E is between 5° and 25°.

6. The tire according to claim 5, wherein the incisions are spaced in the circumferential direction with a pitch p which satisfies the following relationship:

$$0.5 \le \frac{Sne}{Se} \cdot \frac{p}{H} \le 4$$

wherein, Sne is the total outer surface area of the edge ribs, Se is the total of the outer surface area of the intermediate ribs, and H is the average depth of the grooves of generally circumferential direction.

7. The tire according to claim 1, wherein the incisions are arcuately shaped in the radial direction.

8. The tire according to claim 1, wherein the incisions are formed with at least two rectilinear portions in the radial direction.

9. A steer axle tire for a heavy vehicle, the tire designed for a single rolling direction and comprising a radial carcass reinforcement surmounted by a crown reinforcement, and a tread ,the tire having means indicating the single rolling direction, the tread comprising ribs separated by grooves of generally circumferential orientation, two of said ribs forming the edges of the tread, at least two of said ribs being intermediate to such two ribs, each intermediate rib having a plurality of incisions, all incisions being V-shaped and oriented in the same direction, each incision being of a width of less than 3 mm, a depth F when the tire is new and being substantially parallel to each other, wherein, each incision has a varying inclination, being oriented relative to a line perpendicular to an outer surface of the tread at a first angle of zero degrees from the outer surface to a depth of one-third E when the tread is new, and at a second angle greater than said first angle at a depth greater than one-third E, wherein, a radially innermost first point of each incision is located, relative to the indicated rolling direction of the tire, in front of a second point of the incision located on the outer surface of the tread when new, wherein each incision from its second point to its first point, has a generally concave side convex side, the generally concave side facing in the rolling direction, and further wherein the edge ribs are not provided with incisions of varying inclination, the incisions are spaced in the circumferential direction with a pitch p which satisfies the following relationship:

$$0.5 \le \frac{Sne}{Se} \cdot \frac{p}{H} \le 4$$

wherein, Sne is the total outer surface area of the edge ribs, Se is the total of the surface area of the intermediate ribs and H is the average depth of the grooves of generally circumferential direction.

10. The tire according to claim 1 wherein the edge ribs are not provided with any incisions.

11. The tire according to claim 9 wherein the edge ribs are not provided with any incisions.

* * * * *